Patented Mar. 18, 1924.

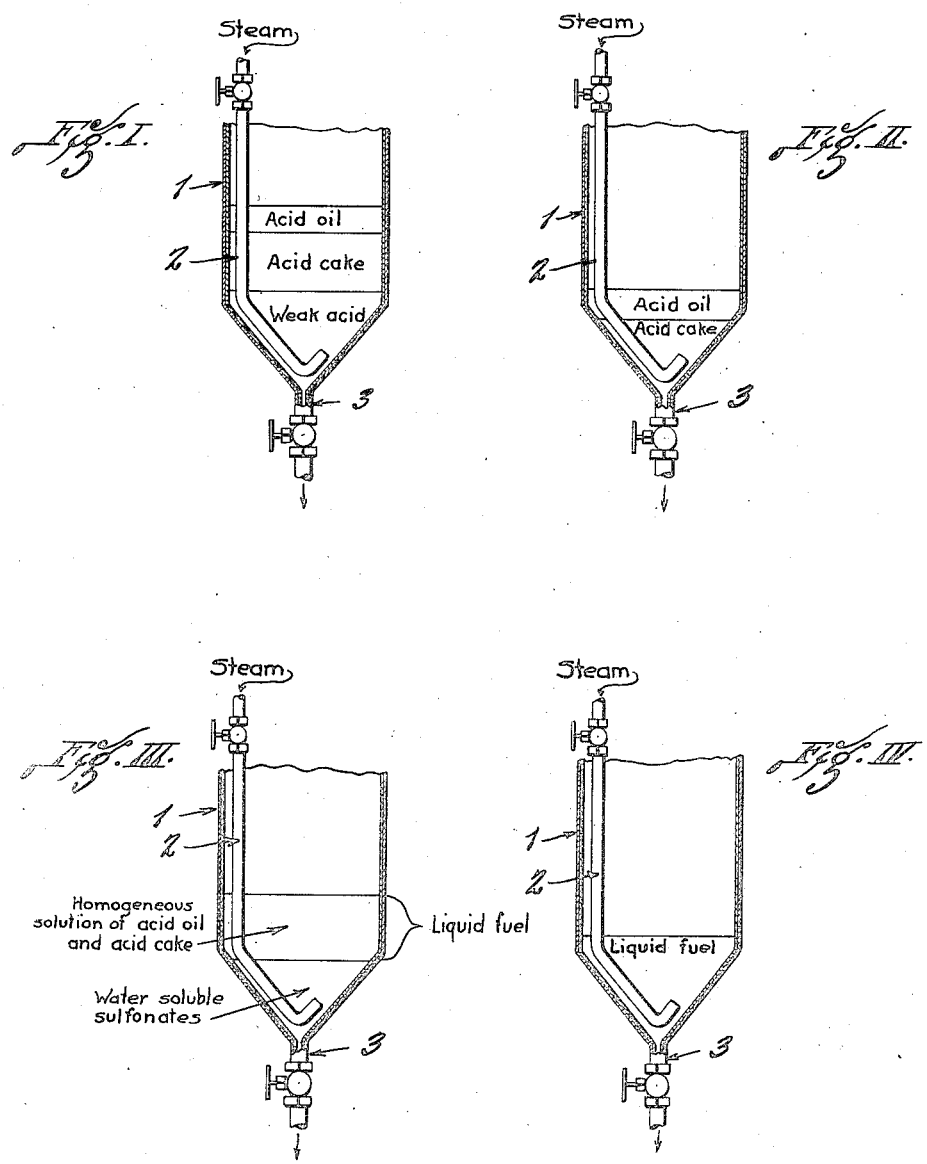

1,487,240

UNITED STATES PATENT OFFICE.

EMERSON C. HIGGINS, JR., OF TULSA, AND ORSINO C. SMITH, OF SAND SPRINGS, OKLAHOMA, ASSIGNORS OF ONE-HALF TO COSDEN & COMPANY, OF TULSA, OKLAHOMA, A CORPORATION OF DELAWARE.

PROCESS OF TREATING ACID SLUDGE.

Application filed September 24, 1920. Serial No. 412,613.

*To all whom it may concern:*

Be it known that we, EMERSON C. HIGGINS, Jr., and ORSINO C. SMITH, citizens of the United States of America, and residents of the city of Tulsa, and the city of Sand Springs, respectively, both in the county of Tulsa and State of Oklahoma, have invented certain new and useful Improvements in Processes of Treating Acid Sludge, of which the following is a full, clear, and exact description, reference being had to the accompanying drawings, forming a part of this specification.

This invention relates to a process of treating sulfuric acid sludge obtained from the treatment of petroleum products with sulfuric acid. Sulfuric acid is used in the refining of petroleums, and there is obtained from the acid sludge a product generally known as "acid cake." This acid cake is extremely troublesome to handle, in that it cannot easily be disposed of except in the manufacture of asphalts, pitches and oxygenated products of a similar nature. It is not soluble in hydrocarbon oils and therefore cannot be used as a liquid fuel so that up to the present in case pitch is not manufactured this commodity must be dumped into pits, resulting in a loss of the cake itself plus the added expense of its disposal. When this acid cake is dry and hard, it is possible to burn it, but it will burn with an enormous quantity of smoke and will not burn efficiently in a fire-box of common design.

One of the objects of our invention is to render this acid cake soluble in hydrocarbon oils so that the asphalts will not settle out of the resultant solution even after standing for long periods of time and hence the solution may be used as a liquid fuel, having a high calorific value.

Another object of our invention is to recover the sulfonic compounds present in the sulfuric acid sludge. This is done by making the mixture of acid oil and acid cake neutral or slightly alkaline thereby converting the sulfonates and sulfates into water-soluble sodium salts and separating out these salts. Due to the presence of the oil and difference in the specific gravities between these water-soluble sulfonates and the oil, the water-soluble sulfonates and sulfates will gradually separate out.

Fig. I is a diagrammatical view showing an apparatus adapted for use in carrying out the process, and illustrating one of the first steps of the process.

Fig. II is a view similar to Fig. I illustrating the result of a subsequent step.

Fig. III is a similar view showing the result of another step.

Fig. IV is a similar view showing the result of another step.

In the preferred form of the invention, the acid sludge to be treated is contained in a suitable open container 1, (this container being preferably lead lined and having a conical bottom), and to the sludge is added hot water of an amount which may be equal to 5% to 25% of the volume of the sludge, the quantity of water being dependent upon the quality of sludge being treated. This mixture is agitated with live steam discharged from a pipe 2 for about two to four hours, or longer if necessary, in order to get as complete an extraction of acid as is possible.

The mixture is then allowed to settle and will form into three layers, viz, acid oil on top, acid cake in the middle layer, and weak acid at the bottom of the container as shown by Fig. I. This weak acid is then drawn off the bottom through a pipe 3 and delivered to suitable storage tanks. The weak acid may be either concentrated or otherwise treated in any suitable manner. In order to get a further separation of the weak acid from the mixture, more hot water is added, of an amount equal to 2% to 10% of the volume of the mixture and the mixture is again agitated with live steam and allowed to settle as in the first agitation and settling. The resultant weak acid is again drawn off and stored. The operation of adding hot water, agitating, settling and drawing off are repeated until the acid drawn off is below 10° Baumé. The contents of container 1 will then appear as shown in Fig. II.

Hitherto the acid oil remaining on top of the acid cake after the last of the weak acid has been drawn off would be drawn off by a pump or a like means and used for fuel, leaving the acid cake as a residue.

In our process for rendering the acid cake soluble in hydrocarbon oils, we pursue the same method of separating out the weak acids as above outlined. After all the weak acid is separated out, the acid oil is not pumped off, but is allowed to remain in the separator with the acid cake as shown in Fig. II. The amount of acid oil present is preferably at least 25% of the total volume of the mixture and we have found that this amount of oil will render the cake soluble so that it will have a low viscosity and will give very efficient results, although this quantity of oil is not a fixed one and is dependent upon the quality of the cake and the acid oil. The acid cake can be rendered soluble without the presence of any oil, but the resulting product would be very viscous.

To the mixture of acid cake and acid oil, an alkali is added, as for instance, soda ash, caustic soda, lime, etc., and the mixture agitated with live steam until the resultant solution is no longer acid but is neutral or even slightly alkaline. At intervals during the neutralization of the mixture, quantities of the water-soluble sulfonates and sulfates (Fig. III) formed in the reaction are drawn off through pipe 3 in the bottom of the tank and stored for further treatment. It is due to the presence of these water-soluble sulfonates that about 25% of oil is desired in the mass to be treated, because a small range of difference in the specific gravities of the asphaltic material and water does not effect rapid settling out of the latter, whereas in the presence of oil this asphaltic material gradually goes into solution and the difference in gravities becomes greater and allows a more rapid settling out of the water containing the sulfonates and sulfates.

When the entire mass has become neutral or slightly alkaline, it is allowed to settle for approximately two hours, and the remaining water-soluble sulfonates and sulfates drawn off. The residue (Fig. IV) will be a homogeneous mixture, all the asphaltic material having been dissolved in the oil present. This residue is then allowed to cool and can be used as liquid fuel, for the asphalt in the solution does not settle out even when standing for a long period of time. This liquid fuel has a high calorific content, ranging from 14,000 to 18,000 B. T. U. per pound and it will burn completely, giving no smoke when properly handled.

We claim:

1. In the art of converting acid sludge obtained from the treatment of petroleum products with sulphuric acid into liquid fuel, the process of rendering acid cake derived from said acid sludge soluble in hydrocarbon oil, consisting in treating a mixture of acid cake and hydrocarbon oil with an alkali, and agitating the resultant mixture with steam, whereby a homogeneous liquid fuel is obtained, substantialy as described.

2. The process of converting into liquid fuel the acid sludge obtained from the refining of petroleum products, said process consisting in treating said sludge with an alkali, treating said sludge with live steam and removing the lowermost layer, thereby obtaining a homogeneous liquid fuel in the upper layer.

3. In the art of treating acid sludge, the process of rendering acid cake soluble in hydrocarbon oil, consisting in treating a mixture of acid cake derived from said acid sludge and hydrocarbon oil with an alkali, agitating the same with steam whereby water-soluble sulfonates are separated out, settling and drawing off said sulfonates whereby the residual solution will be homogeneous liquid fuel, substantialy as described.

4. In the art of converting acid sludge obtained from the treatment of petroleum products with sulfuric acid into liquid fuel, the process of rendering acid cake derived from said acid sludge soluble in hydrocarbon oil, consisting in treating a mixture of acid cake and hydrocarbon oil with an alkali until slightly alkaline, agitating the mixture with live steam, settling and drawing off the deposited water-soluble sulfonates, whereby the residual solution will be a homogeneous liquid fuel, substantially as described.

5. In the art of refining acid sludge, the process of rendering an asphaltic-base acid cake soluble in hydrocarbon oil, consisting in commingling such acid cake and hydrocarbon oil with an alkali until slightly alkaline, at the same time agitating the mixture with steam, drawing off the water-soluble sulfonates as they are formed, settling the mixture and drawing off the remaining water-soluble sulfonates, thereby leaving a residue consisting of a homogeneous mixture of asphaltic material and oil, substantially as described.

6. The process of obtaining a liquid fuel from acid sludge obtained in the purification of petroleum comprising the steps of freeing said sludge of its free acid, whereby a layer of acid oil and a layer of acid cake are obtained, neutralizing said layers with an alkali and agitating the mixture with steam, whereby a homogeneous liquid fuel is obtained.

In testimony that we claim the foregoing we hereunto affix our signatures.

EMERSON C. HIGGINS, Jr
ORSINO C. SMITH.